United States Patent [19]

Thivichon-Prince et al.

[11] Patent Number: 4,661,055

[45] Date of Patent: Apr. 28, 1987

[54] MOULDING ASSEMBLY FOR THE INJECTION OF PLASTIC MATERIALS

[75] Inventors: Guy Thivichon-Prince, Oullins; Jacky Thivichon-Prince, Brignais, both of France

[73] Assignee: Industries Plastiques Maules—IPM, France

[21] Appl. No.: 764,645

[22] Filed: Aug. 12, 1985

[51] Int. Cl.⁴ .............................................. B29C 45/40
[52] U.S. Cl. ..................................... 425/556; 425/444
[58] Field of Search ................. 425/450.1, 451, 451.9, 425/542, 554, 556, 190, 577, 588, 196; 249/160, 161, 162, 67

[56] References Cited

U.S. PATENT DOCUMENTS

| | | | |
|---|---|---|---|
| 2,330,369 | 9/1943 | Marsh | 425/554 |
| 2,511,079 | 6/1950 | Robb | 425/556 |
| 2,531,965 | 11/1950 | Beck et al. | 249/205 |
| 2,564,615 | 8/1951 | Tallberg | 425/450.1 |
| 2,759,231 | 8/1956 | Parlanti | 249/135 |
| 3,174,189 | 3/1965 | Cutler et al. | 249/66 R |
| 3,197,825 | 8/1965 | Hammond | 425/556 |
| 3,932,085 | 1/1976 | Horbach | 425/186 |
| 4,162,138 | 7/1979 | Byrne | 425/451.9 |
| 4,249,882 | 2/1981 | Koch et al. | 425/554 |

FOREIGN PATENT DOCUMENTS 1316838 3/1962 France .
2360398 4/1977 France .

*Primary Examiner*—Willard E. Hoag
*Attorney, Agent, or Firm*—Parkhurst & Oliff

[57] ABSTRACT

This invention relates to a moulding assembly for the injection of plastics materials, constituted by two blocks of light alloy, located on either side of the mould joint, and in which the lower block comprises a closed cavity containing the battery of ejectors, wherein: said cavity in the lower block receiving the battery is closed by a steel plate; said lower block also presents an open cavity adapted to receive the lower mold cavity defining insert member of the mould; the upper block also comprises an open cavity adapted to receive the upper mold cavity defining insert member; and the two blocks are provided with interchangeable steel plates, disposed opposite and in the immediate vicinity of the mould joint.

6 Claims, 2 Drawing Figures

MOULDING ASSEMBLY FOR THE INJECTION OF PLASTIC MATERIALS

The invention relates to a moulding assembly for the injection of plastics materials; it relates more particularly to a moulding assembly with monobloc body made of light alloy, for the injection-moulding of technical pieces in plastics material.

As is known, a moulding assembly also called "carcass" essentially comprises:

two blocks, lower and upper respectively, located on either side of the mould joint, which each bears the lower and upper impressions constituting the mould cavity block, the proper mould;

a battery of ejectors passing through one of the blocks, adapted to repel the moulded piece.

U.S Pat. No. 2,531,965 and French Pat. No. 1 316 838 propose placing the battery in a cavity provided to this end in the lower block. This cavity, not being closed, lacks rigidity when the block is made of light alloy. In addition and in particular, during ejection of the pieces, there is always a high risk of these pieces or other objects penetrating in this open cavity, which may deteriorate the battery.

U.S. Pat. No. 2,564,615 proposes closing this cavity by a plate forming an integral part of the member controlling the injection moulding machine. Consequently, this arrangement which is particularly adapted to injection moulding machines intended for very specific, mass-produced articles, cannot be used with standard presses, i.e. with presses capable of receiving standardized moulds, of different shapes and sizes, like presently known presses.

In short, the heretofore proposed solutions are expensive due to the large number of pieces to be machined and adjusted and are heavy to manipulate or to store, all the more so as, in practice, these pieces are made of steel.

It is an object of the present invention to overcome these drawbacks and the invention relates to a moulding assembly for the injection of plastics materials, of the type in question, which is light, therefore easier to manipulate and to machine.

The moulding assembly according to the invention, for the injection of plastics materials, of the type constituted by two blocks of light alloy, respectively lower and upper, located on either side of the mould joint, and in which the lower block comprises a closed cavity adapted to receive the battery of ejectors, is characterized in that:

said cavity in the lower block receiving the battery is closed by a steel plate fast with attached to this light alloy block;

said lower block also presents an open cavity disposed on the face opposite the face comprising the closed cavity, adapted to receive the lower impression of the mould;

the upper block also comprises an open cavity, disposed opposite the open cavity in the lower block, adapted to receive the upper impression and the member for supplying plastics material; and finally, the two blocks are provided with interchangeable steel plates, disposed opposite and in the immediate vicinity of the mould joint.

In other words, the invention consists:

on the one hand, in forming in the blocks opposite cavities adapted to receive the impressions;

on the other hand, in closing by a steel plate the lower cavity in the lower block receiving the battery, in order to receive columns for guiding this battery and to rigidify this lower block; and finally, in using interchangeable steel plates at mould joint level, in order to improve the resistance of the assembly to the stresses of the injection, particularly to crushing during the repeated closures of the mould, and thus to participate in the rigidification of the assembly with the plate closing the cavity for the battery.

Advantageously, in practice:

The blocks are monobloc, which renders them very rigid and are made of a heat-treated aluminium alloy, for example an alloy of type 7075 or 7010 treated in state T 651 in accordance with the nomenclature of the Aluminium Association and currently designated by the trademark FORTAL HR (registered trademark filed by CEGEDUR—Sociéeté de Transformation de l'Aluminium Péchiney); thus the characteristic cavities of the invention may easily be machined in these two blocks.

The upper block is provided with a steel plate on the face opposite that forming the mould joint, this steel plate being adapted to be inserted or super imposed on the block, particularly with a view to magnetic fixation thereof on the supporting table of the machine-tools used for machining.

The lower cavity where the battery is housed presents pillars cut into the lower block, and the plate for manoeuvring the ejectors of the battery slides in rings fixed on these pillars which also abut on the closure plate, likewise fast with this block; consequently, this closure plate isolates the mechanism of the battery from the outside environment, thus preventing the accidental introduction of dust or foreign bodies in this cavity.

According to an important feature of the invention, the zone of the mould joint therefore comprises two interchangeable steel plates, each fixed to one of the blocks, in order to avoid premature deterioration of this zone which is under considerable stress. The hardness of these interchangeable plates is determined as a function of the expected life of the impressions.

For impressions of large dimensions or those under high stress, it is desirable if the closed cavity in the lower block in which the battery is housed, presents, as has already been mentioned, pillars of appropriate section: circular, oblong, . . . , cut in this lower block so as to serve as local reinforcements.

The way in which the invention can be implemented and the advantages which stem from it will be highlighted in the implementation examples that follow which are provided as non limiting illustrations, supported by the attached plates.

Figure 1:
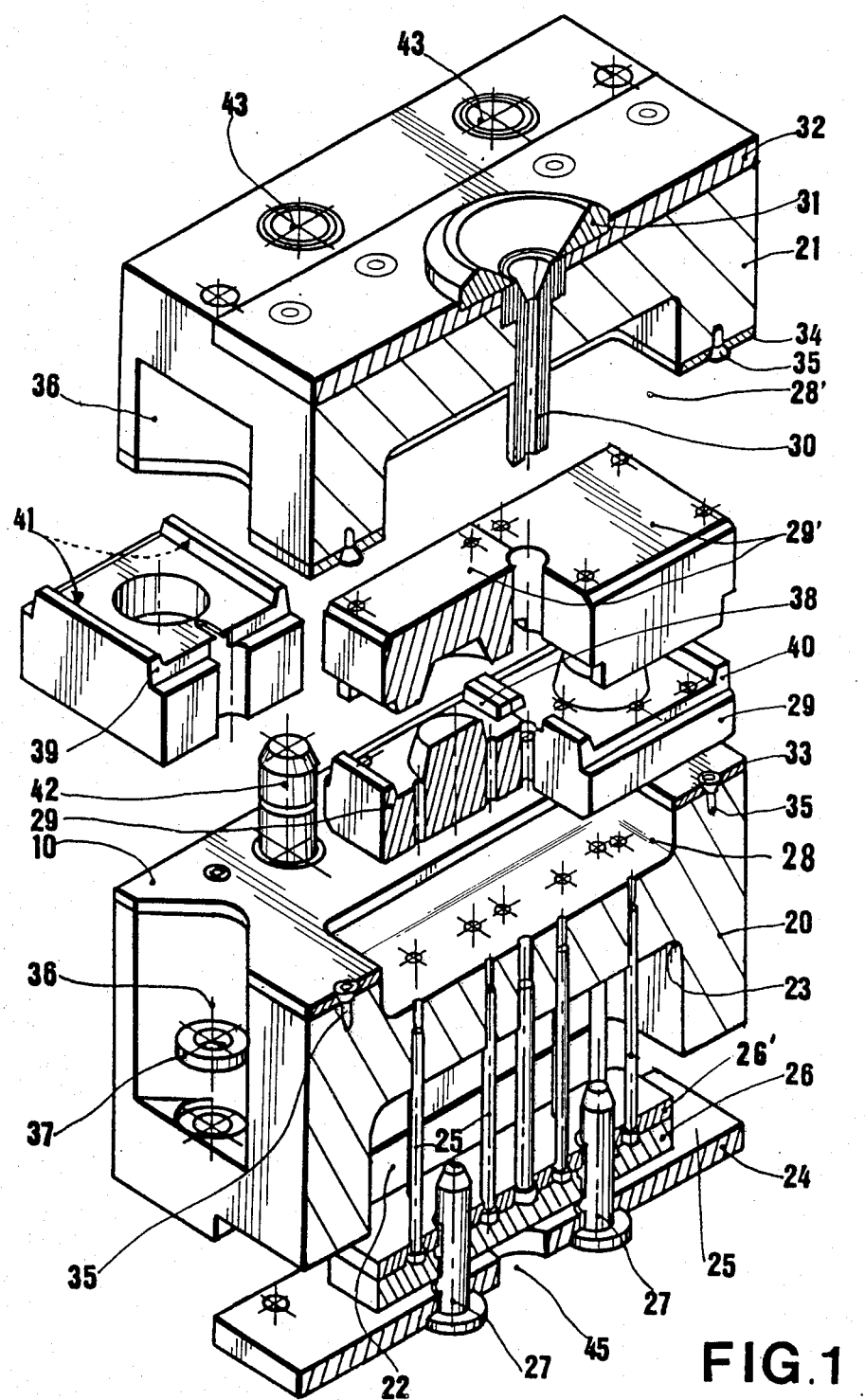
FIG. 1 shows in section and in perspective a moulding assembly according to the invention.

To render the specification simpler and clearer, the moulding assemblies will be described in vertical position, but it goes without saying that they may be used in any position.

Referring now to the drawings, the moulding assembly according to the invention essentially comprises two blocks, lower (20) and upper (21) respectively, made of light alloy, based on aluminium, for example 7075 in state T 651. The lower block 20 presents:

on one hand, in its lower part, a machined cavity 22 with rounded angles 23 closed by a steel plate 24, which contains the ejectors 25 of the battery controlled by a manoeuvring plate 26, formed in two parts 26, 26', mobile vertically over guide columns 27; and, on the other hand, in its upper part, a second cavity 28, likewise with rounded angles, in which is fitted the lower impression 29; for reasons of convenience, this impression 29 is formed in two parts.

Similarly, the upper block 21 presents a cavity 28' in which is fitted the upper impression 29', likewise in two parts. The impressions 29, 29' are fixed in their respective housings 28, 28' in known manner by means of screws (not shown).

The upper block 21 further comprises the channel 30 for injecting the plastics material, as well as the ring 31 for adaptation to the injection channel of the moulding machine. The upper part comprises an added steel plate 32 intended to facilitate machining of this block 21.

These two lower and upper assemblies 20, 21 are, in known manner, fixed to each of the supporting tables (not shown) of the moulding machine.

According to a feature of the invention, on the surfaces of the two blocks 20, 21 adapted to come opposite each other and to form the mould joint 10, there are also added two interchangeable plates 33, 34 fixed by screws 35, made of steel for example in blue annealed sheet, calibre sheet or steel treated for 1800 MPa or more, and even hardened steel. The hardness of these characteristic interchangeable plates 33, 34 is determined as a function of the life envisaged for the impressions 29, 29'.

The blocks 20, 21 also comprise lateral recesses 36 which allow said blocks to be fixed to the supporting tables (not shown) of the moulding machine via screws (not shown). In order to avoid local caulking of the blocks, a steel washer 37 is fitted in the block beneath the head of each fixing screw.

The lower (29) and upper (29') impressions present prismatic bearing surfaces of trapezoidal section which enable them to be centred one with respect to the other. In this way, surface 38 comes into contact with surface 39 or surface 40 (FIG. 2) with surface 41, this perfectly defining the relative positions of the two impressions 29, 29' in two perpendicular directions. To facilitate understanding, the element referenced 39 and 40 to the left of FIG. 1 is a view in perspective from underneath of one of the two parts of the upper impression 29'.

The lower block bears a plurality of centering pins such as 42, which engage in the corresponding sleeves in the upper block, such as 43.

Figure 2:
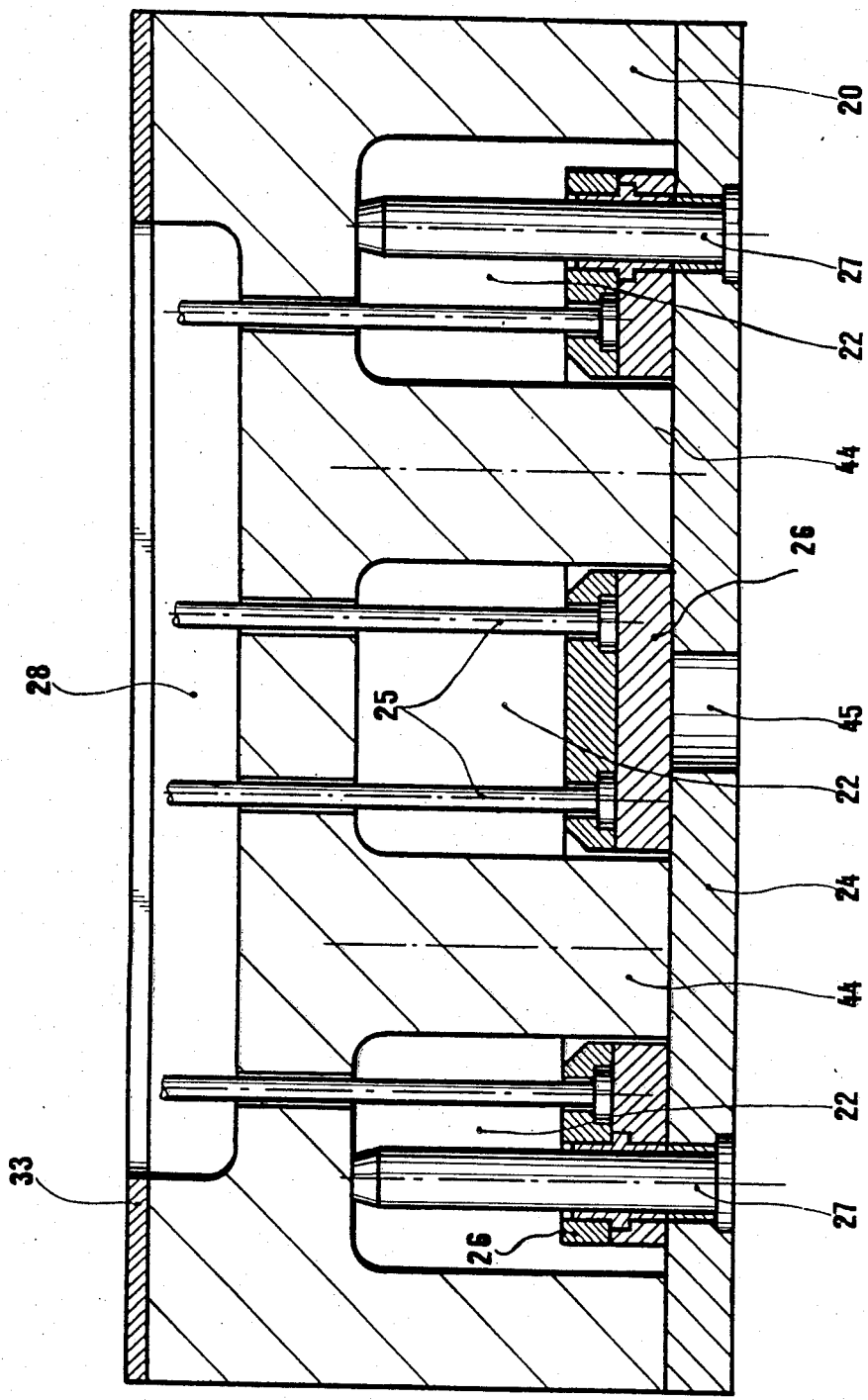
FIG. 2 shows a view in axial section of a particular embodiment of the characteristic closed cavity in which the battery is housed.

FIG. 2 shows that the cavity of battery 22 is traversed by two support pillars 44 of circular section, forming an integral part of the lower block 20 and cut therein. These pillars 44 transfer onto the closure plate 24 the efforts undergone by impression 29; this plate 24 is pierced with an opening 45 which allows the manoeuvre of the ejection assembly 25, thanks to a jack (not shown) fixed on the moulding machine.

In an advantageous economical embodiment (not shown), the columns 27 for guiding the battery are eliminated, and the manoeuvring plate 26, 26' comprises rings which slide on the support pillars 44. In practice, these rings are made of a material with a low coefficient of friction, such as polytetrafluoroethylene.

The moulding assemblies according to the invention present numerous advantages over those marketed heretofore. For example:

lightness, therefore easy manipulation and storage, since the blocks 20, 21 are made of light alloy;

easy machining of these blocks, hence economy;

good mecanic conductivity of the blocks, this promoting rapid heating or cooling of the impressions and pieces if necessary;

possibility for these totally equipped blocks to be easily mounted on standard injection moulding machines.

What is claimed is:

1. Injection molding apparatus, comprising:
   a first mold block cast of a single piece of light alloy material, defining first and second cavities therein, said first mold block having plural ejector means projecting therethrough, said first cavity being closed by a steel plate, said first cavity enclosing therein means for maneuvering said ejector means, said second cavity having at least one mold cavity defining insert member disposed therein;
   a second mold block cast of a single piece of light alloy material, defining a third cavity therein, said third cavity having at least one mold cavity defining insert member disposed therein, and means for supplying thermoplastic molding material to mold cavities defined by said mold cavity defining insert members;
   a face of said first mold block opposite to said first cavity having disposed adjacent thereto a first interchangeable steel plate, and a face of said second mold block opposite to said means for supplying having a second interchangeable steel plate which is interchangeable as said first interchangeable steel plate, said interchangeable steel plates being in contact with each other in the vicinity of a contact surface between said mold cavity defining insert members.

2. The injection moulding apparatus of claim 1, wherein said lower bock comprises support pillars extending into said first cavity, said support pillars being attachable to said steel plate for closing said first cavity.

3. The injection moulding apparatus of claim 1, wherein said upper block comprises a steel plate on a face opposite said third cavity.

4. The injection moulding apparatus of claim 3, wherein said lower bock comprises support pillars extending into said first cavity, said support pillars being attachable to said steel plate for closing said first cavity.

5. The injection moulding apparatus of claim 1, wherein said light alloy is a heat-treated aluminum alloy.

6. The assembly of claim 5, wherein the aluminium alloy is an alloy 7075 or 7010 in state T 651.

* * * * *